(12) United States Patent
Price

(10) Patent No.: US 12,357,904 B2
(45) Date of Patent: Jul. 15, 2025

(54) CARD GAME SYSTEM FOR THE VISUALLY AND/OR HEARING IMPAIRED

(71) Applicant: Donnell Price, Bronx, NY (US)

(72) Inventor: Donnell Price, Bronx, NY (US)

( * ) Notice: Subject to any disclaimer, the term of this patent is extended or adjusted under 35 U.S.C. 154(b) by 291 days.

(21) Appl. No.: 18/300,055

(22) Filed: Apr. 13, 2023

(65) Prior Publication Data

US 2024/0139612 A1 May 2, 2024

Related U.S. Application Data

(60) Provisional application No. 63/421,217, filed on Nov. 1, 2022.

(51) Int. Cl.
*A63F 1/18* (2006.01)
*A63F 1/00* (2006.01)
*A63F 1/02* (2006.01)
*G09B 21/00* (2006.01)

(52) U.S. Cl.
CPC ............ *A63F 1/18* (2013.01); *A63F 1/02* (2013.01); *G09B 21/003* (2013.01); *G09B 21/006* (2013.01); *A63F 2001/003* (2013.01); *A63F 2001/005* (2013.01); *A63F 2001/006* (2013.01)

(58) Field of Classification Search
CPC .. A63F 1/18; A63F 1/02; A63F 9/0001; A63F 2009/0001; A63F 2009/0004; G09B 21/003; G09B 21/006
See application file for complete search history.

(56) References Cited

U.S. PATENT DOCUMENTS

| | | | |
|---|---|---|---|
| 9,994,041 B2 | 6/2018 | Morgan | |
| 2004/0026636 A1* | 2/2004 | Shigeta | B07C 5/3422 250/556 |
| 2007/0225055 A1* | 9/2007 | Weisman | A63F 1/14 273/149 P |
| 2009/0273560 A1 | 11/2009 | Kalanithi | |
| 2011/0133407 A1* | 6/2011 | Kim | A63F 1/02 273/293 |
| 2011/0312420 A1 | 12/2011 | Portin | |
| 2014/0377721 A1 | 12/2014 | Reid | |
| 2015/0224390 A1* | 8/2015 | McCary, Sr. | A63F 1/18 463/9 |
| 2015/0328541 A1 | 11/2015 | Van Haaften | |
| 2022/0008815 A1* | 1/2022 | Khorana | A63F 3/00643 |
| 2022/0139259 A1* | 5/2022 | Novak | H04R 1/028 434/116 |

* cited by examiner

Primary Examiner — James S. McClellan
(74) Attorney, Agent, or Firm — Brennan, Manna & Diamond, LLC

(57) ABSTRACT

This present invention relates to a card game system that assists visually and/or hearing-impaired individuals play card games. The card game system is comprised of a game board, one or more decks of playing cards, and a choice of Bluetooth or embedded speakers. Each card has a printed suit and a rank, and an optical code encoded with the suit and the rank of the card. A braille pad can be used for denoting the suit and the rank of the card. The game board has an optical scanner for scanning the optical code of cards placed on the board for identifying the suit and the rank of the cards and for announcing the suit and the rank using the Bluetooth or embedded speakers. The board has a processor identifying a winner of a game based on the moves and sequence of cards placed on the board.

20 Claims, 4 Drawing Sheets

CARD GAME SYSTEM FOR THE VISUALLY AND/OR HEARING IMPAIRED

CROSS-REFERENCE TO RELATED APPLICATION

The present application claims priority to, and the benefit of, U.S. Provisional Application No. 63/421,217, which was filed on Nov. 1, 2022 and is incorporated herein by reference in its entirety.

FIELD OF THE INVENTION

The present invention relates generally to the field of card games. More specifically, the present invention relates to a card game system that helps visually and/or hearing-impaired individuals play conventional card games with their friends and family without any communication issues. The card game system has decks of playing cards in which each card has braille tactile indicator indicating suit and rank of the card. A game board has speakers for announcing the card placed thereon enabling all players to listen to the card being placed by a player for playing the game. Accordingly, the present disclosure makes specific reference thereto. Nonetheless, it is to be appreciated that aspects of the present invention are also equally applicable to other like applications, devices, and methods of manufacture.

BACKGROUND

By way of background, card games like solitaire, poker, blackjack, rummy, and more are a well-known form of recreation and entertainment. Games are typically played with one or more decks of cards, where each deck typically includes 52 cards. Each deck of cards typically includes four suits of cards, including: hearts, diamonds, clubs, and spades, wherein each suit includes thirteen cards having rank: 2, 3, 4, 5, 6, 7, 8, 9, 10, Jack, Queen, King, and Ace. Some card games may include wagering games. Generally when playing games, cards are selected and drawn one-by-one or multiple cards together. However, conventional card games only enable individuals that can see and hear to play the game, and therefore blind and/or deaf individuals typically cannot play and enjoy such card games. Such individuals may start to feel like they do not belong, ultimately developing anxiety and other frustrations. Deaf individuals, although having the ability to see the cards, may have difficulty in communicating cards to other players. Individuals desire an improved card game system that enables blind and/or deaf individuals to play card games easily. Such a game system may have braille tactile indicators on the cards and also a system that may assist such players in playing the game.

Therefore, there exists a long-felt need in the art for a card game system that enables blind and/or deaf individuals to play card games with friends and family. There is also a long-felt need in the art for a card and game board system that uses braille on each card enabling blind and/or deaf individuals to sense and identify a card. Additionally, there is a long-felt need in the art for a card game system that can be used for playing any conventional card game. Moreover, there is a long-felt need in the art for an improved card game system that may announce information on a card for hearing-impaired individuals to identify the card. Further, there is a long-felt need in the art for a card game system that eliminates communication issues between visually and/or hearing-impaired individuals and friends and family while playing card games. Furthermore, there is a long-felt need in the art for an improved card game that uniquely identifies a card independent of a user seeing the suit and rank of the card. Finally, there is a long-felt need in the art for card game system that develops a sense of normalcy and community for blind and/or deaf individuals, ensuring they can play games with friends and family.

The subject matter disclosed and claimed herein, in one embodiment thereof, comprises a braille card game system. The game system including a sturdy game board, a plurality of 52-playing card decks, each deck including four suits and thirteen ranks in each suit, each playing card has a face having a suit and a value printed thereon, the face further has a braille pad positioned on a bottom right corner denoting the value and suit of the card enabling a blind and/or deaf player to uniquely identify the card, a barcode having encoded card information printed on the face; the game board includes an optical scanner for scanning the optical code for identification of the suit and rank of the card placed on a top surface of the board, at least one embedded speaker for announcing the suit and rank of the card placed on the top surface enabling all the players playing the game to know of the suit and the value of the placed card, and an internal memory for storing braille corresponding to the card. The optical scanner scans the moves and sequence of cards placed on the board for determination of a winner of a game.

In this manner, the braille card game system of the present invention accomplishes all of the foregoing objectives and provides visually and/or hearing-impaired individuals a card game system featuring cards implemented with braille pads in one or more corners for visually impaired individuals to identify the card. A game board has embedded speakers or coupled speakers for audibly announcing cards placed on the playing surface for visually and/or hearing-impaired individuals to identify the card. The game system develops a sense of normalcy and community for blind and/or deaf individuals, ensuring they can play games with friends and family without any communication gaps.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a braille playing card game system. The game system including a game board, a plurality of 52-playing card decks, each deck including four suits and thirteen ranks in each suit, each playing card has a face having a suit and a value printed thereon for uniquely identifying the card in a deck, the face further includes a braille pad positioned on a bottom right corner denoting the value and suit of the card enabling a blind and/or deaf player to uniquely identify the card, an optical code printed on the face wherein the code has encoded card identifying information; the game board includes an optical scanner for scanning the optical code and a processor to identify the suit and value of the card placed on the top surface of the board, at least one embedded speaker for announcing the card placed on the top surface enabling all the players playing the game to know of the placed card, and an internal memory for storing braille corresponding to the card.

In yet another embodiment, the optical scanner scans the playing moves and the sequentially placed cards on the top surface of the game board.

In yet another embodiment, a card game system for enabling blind and/or deaf players to play conventional card games like solitaire, poker, blackjack, and more is disclosed. The game system includes a sturdy game board, three decks of 52-playing cards, a Bluetooth speaker and at least one braille tablet. The three decks are identical and each card in a deck is unique and has a unique combination of suit and rank, each card has a visual suit and value along with a braille pad identifying the suit and value/rank of the card, the braille pad enables blind and/or deaf players to uniquely identify the card for playing a game, a barcode having encoded card information is printed on each card. The game board is coupled to the Bluetooth speaker using a Bluetooth channel and is further configured to scan the barcode using an optical scanner for identifying suit and value of the card, the Bluetooth speaker announces the suit and value of the card on successful determination by the game board. The braille tablet receives braille representation of the identified card from the game board for display on the braille tablet and thereby enabling a blind and/or deaf player to touch the braille representation of the card.

In yet another embodiment, the game board has a Bluetooth chip for establishing a Bluetooth channel with the braille tablet and the Bluetooth speaker.

In yet another embodiment, the game board has a built-in rechargeable battery for providing electric power for operation of the game board.

In yet another embodiment, a method for playing conventional playing card games like solitaire, poker, blackjack, and more is described. The method includes the steps of providing a card game set, the game set includes three decks of playing cards, each playing card having a suit and a value and a braille pad corresponding to the suit and the value of the card, each card further has a barcode encoding the identification of the card, a game board on which the cards are drawn during a game and the game board is configured to read the barcode for identifying a card, and a speaker for announcing the suit and value of the identified card; identifying a card by a blind and/or deaf player using the braille pad of the card; placing the card on the game board; scanning the barcode of the placed card by an optical scanner of the game board; announcing the value and suit of the card using built-in speakers; and storing the braille of the card in an internal memory of the game board.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
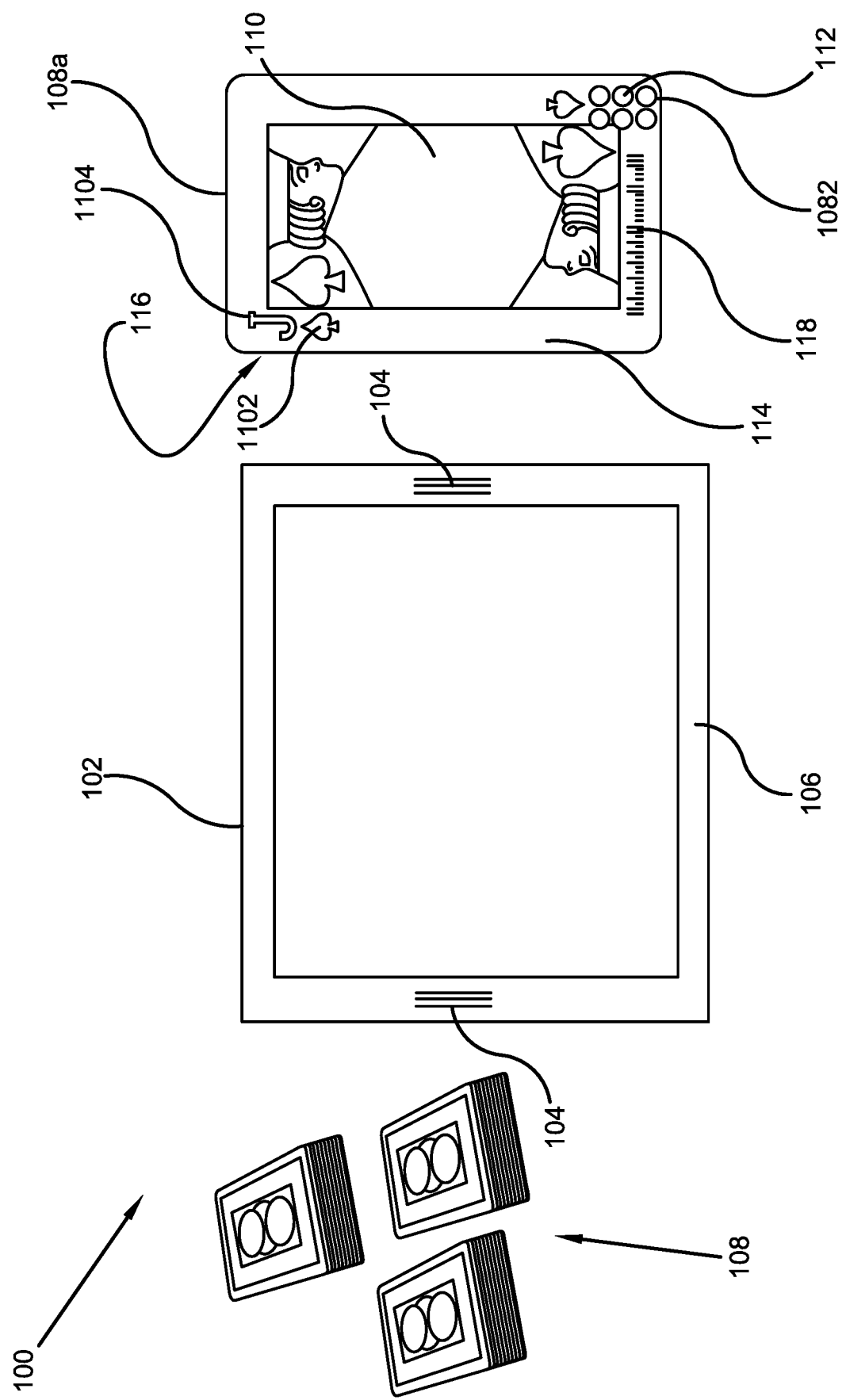
FIG. 1 illustrates a perspective view of a braille card game system of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a card game system that enables blind and/or deaf individuals to play card games with friends and family. There is also a long-felt need in the art for a card and game board system that uses braille on each card enabling blind and/or deaf individuals to sense and identify a card. Additionally, there is a long-felt need in the art for a card game system that can be used for playing any conventional card game. Moreover, there is a long-felt need in the art for an improved card game system that may announce information of cards for hearing-impaired individuals to identify cards. Further, there is a long-felt need in the art for a card game system that eliminates communication issues between visually and/or hearing-impaired individuals and friends and family while playing card games. Furthermore, there is a long-felt need in the art for an improved card game that uniquely identifies a card independent of a user seeing the suit and rank of the card. Finally, there is a long-felt need in the art for card game system that develops a sense of normalcy and community for blind and/or deaf individuals, ensuring they can play games with friends and family.

The present invention, in one exemplary embodiment, is a card game system for enabling visually and/or hearing-impaired individuals play conventional card games like solitaire, poker, blackjack, and more with their friends and family without any communication issues. The game system includes a sturdy game board, three decks of 52-playing cards, a Bluetooth speaker and at least one braille tablet. The three decks are identical and each card in a deck is unique and has a combination of suit and rank, each card has a braille pad identifying the suit and rank of the card, the braille pad enables blind and/or deaf players to uniquely identify the card for playing a game, a barcode having encoded card information is also printed on each card. The game board is coupled to the Bluetooth speaker using a Bluetooth channel and is further configured to scan the barcode using an optical scanner for identifying suit and rank of the card, the Bluetooth speaker announces the suit and rank of the card on successful determination by the game board. The braille tablet receives braille representation of the identified card from the game board for display on the braille tablet and thereby enabling a blind and/or deaf player to touch the braille representation of the card.

Referring initially to the drawings, FIG. 1 illustrates a perspective view of braille card game system of the present invention in accordance with the disclosed architecture. The braille card game system 100 is designed as a unique card and game board system that enables the blind and/or deaf to play card games like solitaire, poker, blackjack, and much more. More specifically, the game system 100 has a sturdy game board 102, implemented to partake in traditional card games such as poker, blackjack, solitaire, rummy, and more for the blind and/or the deaf. As a result, a multitude of card games can be played on the sturdy game board 102. The sturdy game board 102 is engaged on a tabletop or any other flat surface for providing a familiar set up for users.

In one exemplary embodiment, the game board 102 has a plurality of embedded speakers 104 for announcing the card placed on the game board 102 by a player. Accordingly, the game board 102 enables all the players to know about the card placed on the game board 102. The game board 102 has a top playing surface 106 on which the cards are placed by users and enables the game board 102 to scan the placed cards as described in FIG. 2.

The game system 100 has three decks 108 of playing cards for enabling players to play any card game. Each deck has fifty-two playing cards and each playing card (shown through exemplary card 108a) has a conventional visual representation 110 representing suit 1102 and value/rank 1104 of the card along with a braille tactile indicator 112 related to the visual representation 110. The visual representation 110 and the braille tactile indicator 112 can be positioned on both surfaces (114, 116) of the cards and alternatively can be positioned on one surface. The braille tactile indicator 112 is preferably positioned on the bottom right corner 1082 of the card and on the surface where the representation 110 and braille pad 112 are disposed. The surface of a card on which the braille pad 112 and the visual representation 110 are printed/disposed is also referred to as the face of the card in the present disclosure.

The braille pad 112 enables blind and/or deaf players to easily identify the card before drawing on the game board 102 and therefore, the game system 100 helps in developing a sense of normalcy and community for blind and/or deaf individuals. Each card also has a printed optical pattern, preferably a barcode 118, on face of the card. The barcode 118 uniquely identifies the card from any other card of the deck. It should be noted that the three decks of the game system 100 may have the same set of cards or a different set of cards as per requirements of the card games being played using the game set 100.

The barcode 118 is not readable by a user/player but can be optically read by an optical scanner placed inside the game board 102 for uniquely identifying the card and playing out the card using the speakers 104. The braille pad 112 and the barcode 118 are printed on the face and therefore, are not damaged or altered using card shuffling or when dropped on any surface.

Figure 2:
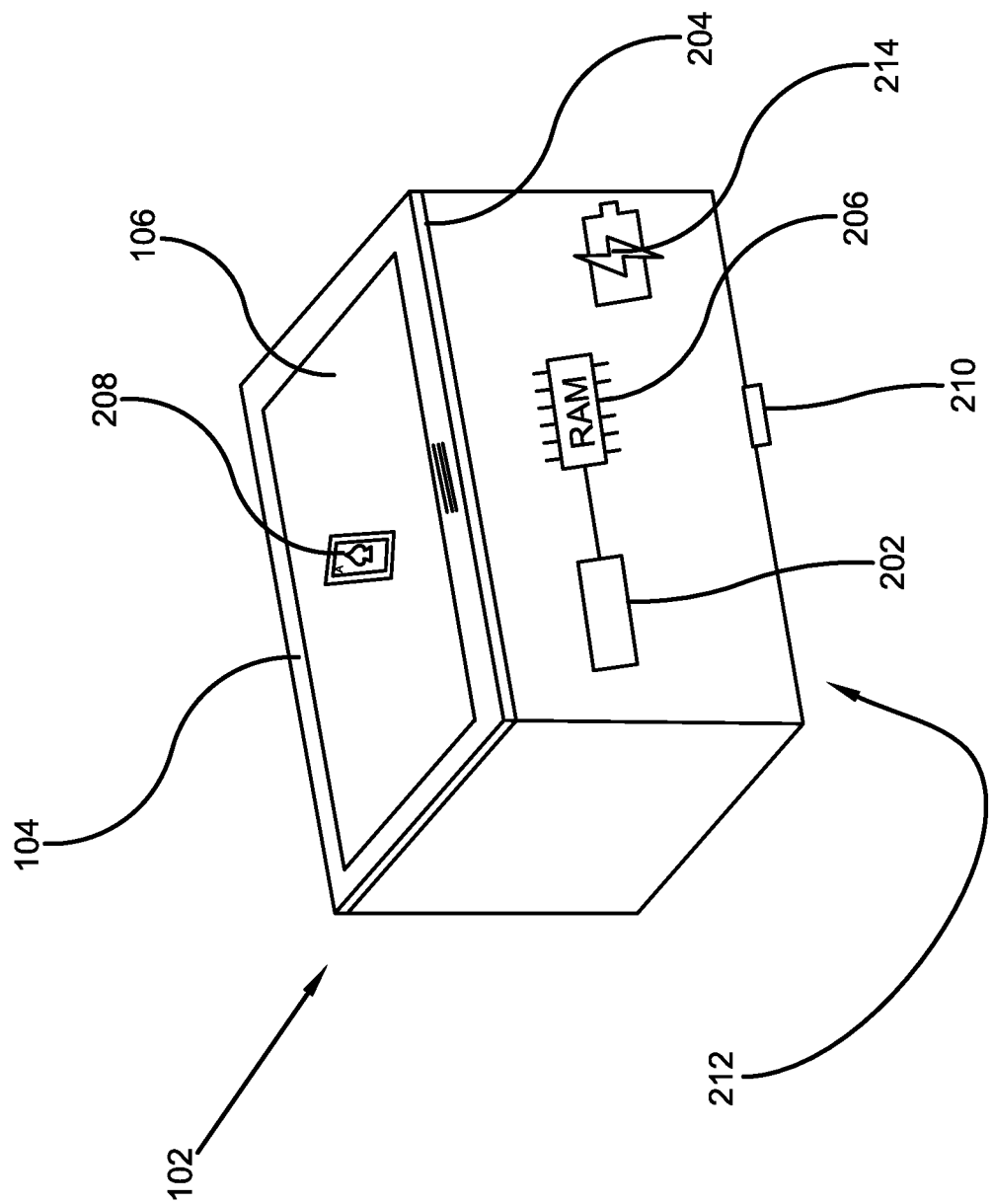
FIG. 2 illustrates a detailed view of one potential embodiment of the card game board of the braille card game system of the present invention in accordance with the disclosed architecture.

FIG. 2 illustrates a detailed view of one potential embodiment of the card game board of the braille card game system of the present invention in accordance with the disclosed architecture. As illustrated, the game board 102 has a processor 202 for activating the optical scanner 204 to scan the barcode of a card placed on the top playing surface 106. The optical scanner 204 is configured to scan a barcode of the card 208 placed at any position on the top playing surface 106. Further, identifying information of the card from the barcode 118 is determined by the processor 202 and is stored in an internal memory 206 of the board 102.

The processor 202 on successfully determining the card suit and value, activates the speakers 104 for announcing the card suit and value. The internal memory 206 stores the identification value of the cards placed sequentially on the game board 106, as a result, enabling the processor 202 to determine a winner of the game. The memory 206 also stores the rules of a plurality of games like poker, blackjack, solitaire, and more for the processor 202 to determine a winner of the game. The optical scanner 204 is also able to optically read events taking place on the game board 102 that enables the processor 202 to track the game and determine the winner. Optionally, the game board 102 may also have a button 210 on the rear surface 212 for choosing a specific game, announcing said game, and for playing the game.

The determined suit and value of the cards placed on the game board 102 are also converted into braille format by the processor 202 and are stored in the memory 206. The stored values and events taken during the game can be announced using the speakers 104.

The game board 102 has an internal rechargeable battery 214 used for providing electric power for operation of the game board 102. The battery 214 can be recharged by means of switching batteries, connecting to a power cord, or wireless induction, as understood for other portable electronic devices. All the components of the game board 102 are connected internally using a wired circuit (not shown) as known in the art.

Figure 3:
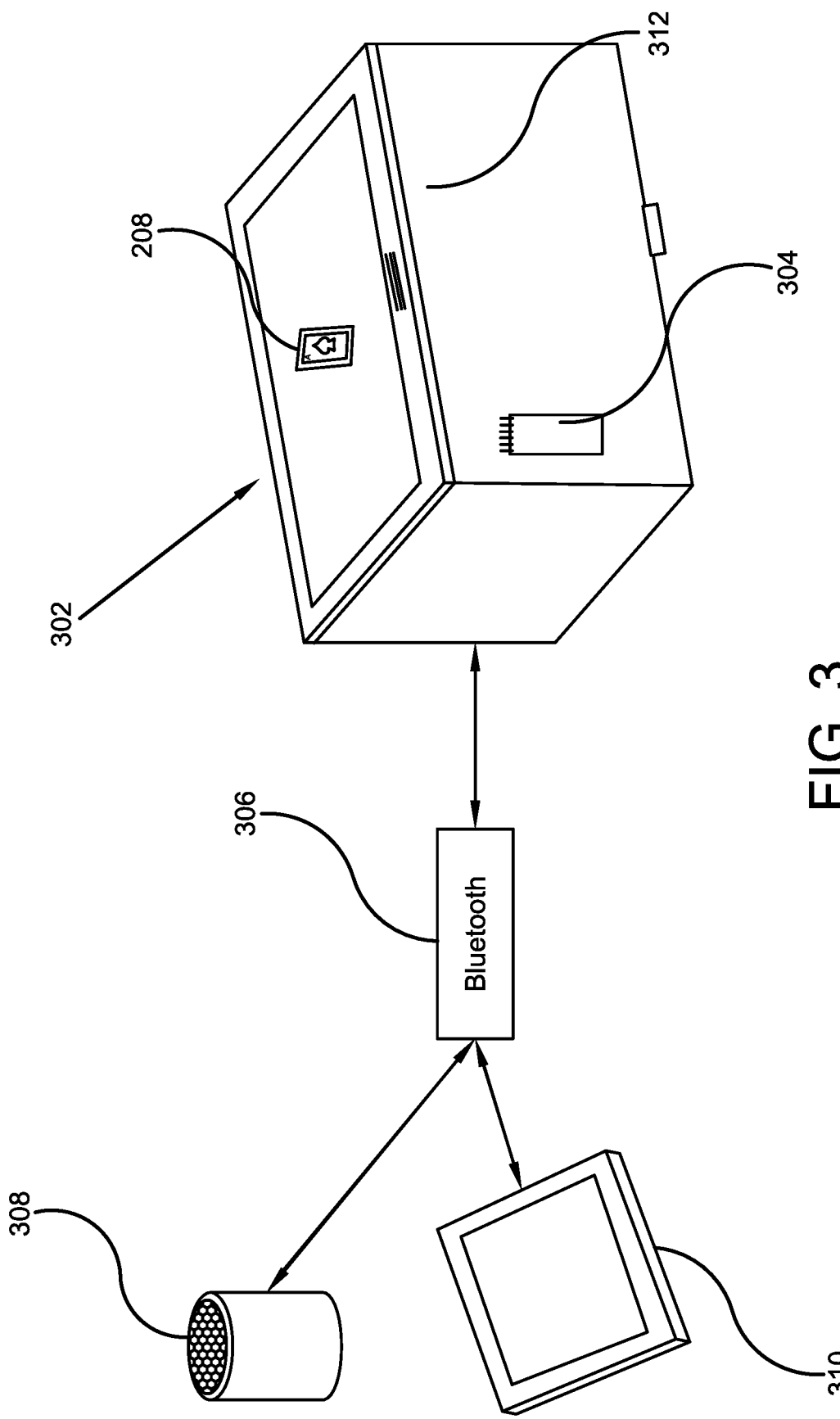
FIG. 3 illustrates a perspective view of another embodiment of the game board for playing braille card games in accordance with the disclosed architecture.

FIG. 3 illustrates a perspective view of another embodiment of the game board for playing braille card games in accordance with the disclosed architecture. In the present embodiment, the game board 302 has a Bluetooth module 304 for establishing a Bluetooth Low Energy (BLE) channel 306 with a Bluetooth speaker 308. A braille tablet 310 is also associated with the game board 302 in the present embodiment where each player playing a card game using the braille cards (as shown in FIG. 1) and the game board 302 has an individual tablet 310. In use, the optical scanner 312 of the game board 302 scans the barcode of the card 208 placed on the board 302 and the determined suit and value of the card 208 is announced by the Bluetooth speaker 308. The game board 302 has other components like a processor, a battery, a memory, and more in a manner similar to of the game board 102 of FIGS. 1 and 2.

The processor also converts the determined value and suit into braille, wherein the braille is then displayed on the braille tablet 310. The braille tablet 310 wirelessly receives braille representation from the game board 302 and enables a player to touch the tablet 310 to check the card being placed on the board 302. The braille of the cards sequentially placed on the board 302 are displayed on the tablet 310.

Figure 4:
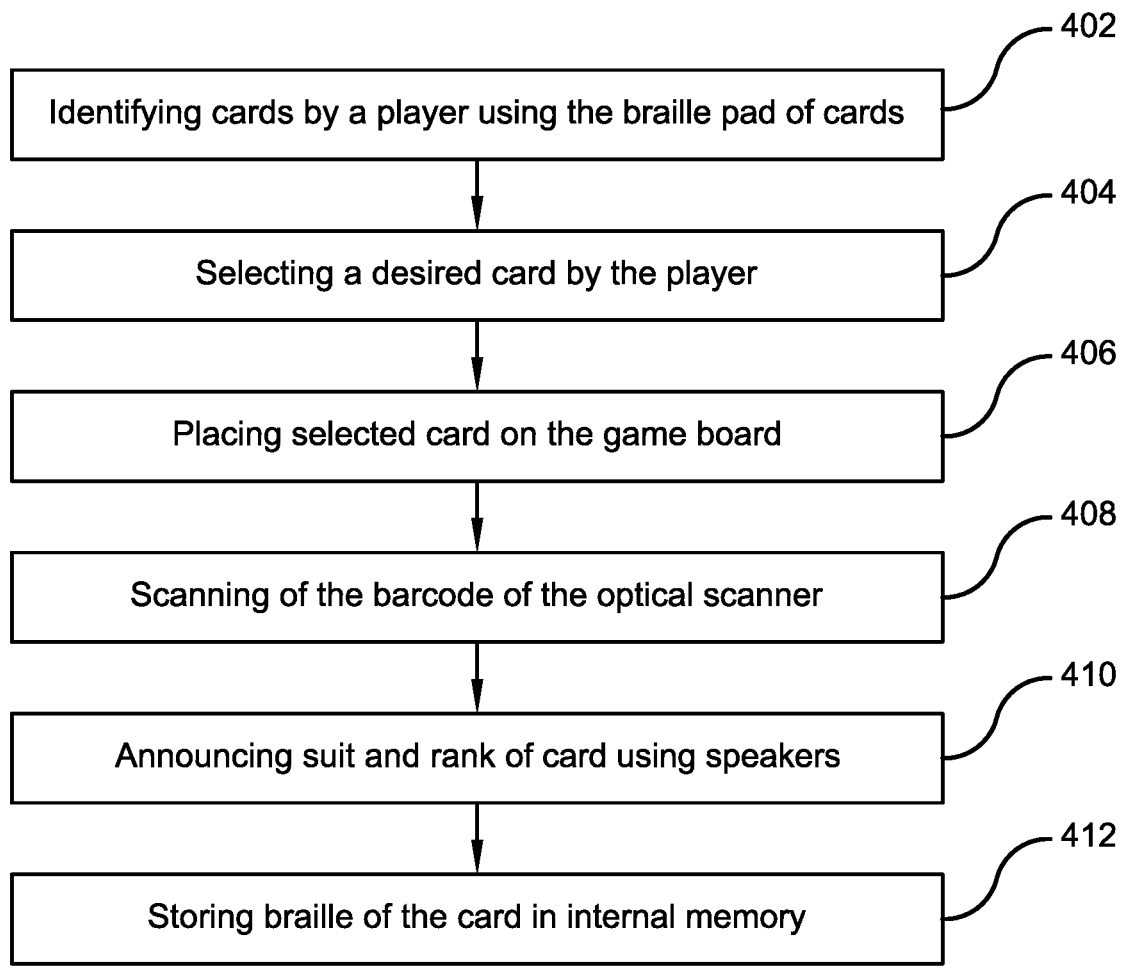
FIG. 4 illustrates a flow diagram depicting an exemplary process of identification of a card by the game system of the present invention in accordance with the disclosed architecture.

FIG. 4 illustrates a flow diagram depicting an exemplary process of identification of a card by the game system 100 of the present invention in accordance with the disclosed architecture. As illustrated, initially, one or more cards are identified by a visually impaired player using the braille pad of the card (Step 402). Any other player can identify the card using braille pad or using the visual suit and rank on face of the card. Then, for playing a game, a desired card is selected by the player (Step 404). The selected card is thereafter placed on the sturdy game board (Step 406).

In the next step 408, the barcode printed on the card placed on the board is optically scanned by the scanner of the game board for determining the suit and rank of the card. Then, using either embedded speakers or Bluetooth speakers, the suit and rank of the card is announced for hearing impaired individuals to identify the particular card(s) (Step 410). The braille of the card is stored in the internal memory of the game board for future use and also for determination of a winner of the game (Step 412). It should be noted that the game board also stores the moves and sequence of the cards placed on the game board for future use.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "card game system", "braille playing card game system", "braille card game system", and "game system" are interchangeable and refer to the braille playing card game system 100 of the present invention.

Notwithstanding the foregoing, the braille playing card game system 100 of the present invention can be of any suitable size and configuration as is known in the art without affecting the overall concept of the invention, provided that it accomplishes the above-stated objectives. One of ordinary skill in the art will appreciate that the braille playing card game system 100 as shown in the FIGS. are for illustrative purposes only, and that many other sizes and shapes of the braille playing card game system 100 are well within the scope of the present disclosure. Although the dimensions of the braille playing card game system 100 are important design parameters for user convenience, the braille playing card game system 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A card game system for blind or deaf players, the card game system comprising:
   a braille playing card game;
   at least one deck of playing cards;
   a game board including a processor, an optical scanner, and a speaker;
   wherein said each playing card includes a visual representation representing a suit and a value of said playing card;
   wherein each said playing card includes a braille tactile indicator related to said visual representation;
   wherein each said playing card includes a printed optical pattern on said face of said playing card to uniquely identify each said playing card from any other said playing card in said deck of playing cards; and
   further wherein said processor for activating said optical scanner to scan said printed optical pattern of each said playing card placed on a playing surface of said game board and for announcing said suit and said value of said scanned said playing card.

2. The card game system of claim 1, wherein said game board includes a plurality of embedded speakers for announcing said playing card placed on said game board.

3. The card game system of claim 1, wherein said deck includes fifty-two playing cards.

4. The card game system of claim 1, wherein said printed optical pattern is a barcode.

5. The card game system of claim 1, wherein said braille playing card game is selected from a group consisting of a solitaire, a rummy, a blackjack and a poker.

6. The card game system of claim 1, wherein said braille playing card game includes at least three decks of cards.

7. The card game system of claim 1, wherein said visual representation and said braille tactile indicator positioned on both surfaces of said playing card.

8. The card game system of claim 1, wherein said processor includes an internal memory for storing said suit and said value of said scanned said playing card.

9. The card game system of claim 8, wherein said internal memory stores a set of rules of a plurality of games, and further wherein said plurality of games is selected from a group consisting of solitaire, rummy, blackjack, and poker.

10. The card game system of claim 9, wherein said processor includes a selection button for choosing and announcing one of said plurality of games.

11. The card game system of claim 9, further comprising a rechargeable battery for providing electric power for said game board.

12. The card game system of claim 11, wherein said speaker is a Bluetooth speaker.

13. The card game system of claim 11, wherein said game board includes a Bluetooth module for establishing a Bluetooth Low Energy channel with said Bluetooth speaker.

14. The card game system of claim 12, further comprising a braille tablet for displaying in braille each said playing card placed on a playing surface of said game board.

15. The card game system of claim 14, wherein said Bluetooth module establishing a Bluetooth Low Energy channel with said braille tablet.

16. A card game system for blind or deaf players, the card game system comprising:
   a braille playing card game;
   at least one deck of playing cards;
   a game board including a processor, an optical scanner, and a speaker;

wherein said each playing card includes a visual representation representing a suit and a value of said playing card;
wherein each said playing card includes a braille tactile indicator related to said visual representation;
wherein each said playing card includes a printed optical pattern on said face of said playing card to uniquely identify each said playing card from any other said playing card in said deck of playing cards;
wherein said processor for activating said optical scanner to scan said printed optical pattern of each said playing card placed on a playing surface of said game board and for announcing said suit and said value of said scanned said playing card;
wherein said processor includes an internal memory for storing said suit and said value of said scanned said playing card;
wherein said internal memory stores a set of rules of a plurality of games; and
further wherein said processor includes a selection button for choosing and announcing one of said plurality of games.

17. The card game system of claim 16, wherein said speaker is a Bluetooth speaker.

18. A card game system for blind or deaf players, the card game system comprising:
a braille playing card game;
at least one deck of playing cards;
a game board including a processor, an optical scanner, and a speaker;
wherein said each playing card includes a visual representation representing a suit and a value of said playing card;
wherein each said playing card includes a braille tactile indicator related to said visual representation;
wherein each said playing card includes a printed optical pattern on said face of said playing card to uniquely identify each said playing card from any other said playing card in said deck of playing cards;
wherein said processor for activating said optical scanner to scan said printed optical pattern of each said playing card placed on a playing surface of said game board and for announcing said suit and said value of said scanned said playing card;
wherein said processor includes an internal memory for storing said suit and said value of said scanned said playing card; and
a braille tablet for displaying in braille each said playing card placed on said playing surface of said game board.

19. The card game system of claim 18, wherein said internal memory stores a set of rules of a plurality of games, and further wherein said processor includes a selection button for choosing and announcing one of said plurality of games.

20. The card game system of claim 19, wherein said game board includes a Bluetooth module for establishing a Bluetooth Low Energy channel with said braille tablet.

* * * * *